United States Patent
Wang et al.

(10) Patent No.: US 8,649,468 B2
(45) Date of Patent: Feb. 11, 2014

(54) MICRO-CONTROLLER, PROCESSING METHOD AND DEVICE FOR POWER LINE CARRIER SIGNAL RECEPTION

(75) Inventors: Rui Wang, Qingdao (CN); Song Pan, Shanghai (CN); Jian Cui, Qingdao (CN); Jun Yuan, Shanghai (CN); Yajun Hu, Qingdao (CN)

(73) Assignees: Qingdao Eastsoft Communication Technology Co., Ltd., Qingdao (CN); Shanghai Haier Integrated Circuit Co., Ltd., Shanghai (CN)

( * ) Notice: Subject to any disclaimer, the term of this patent is extended or adjusted under 35 U.S.C. 154(b) by 0 days.

(21) Appl. No.: 13/609,245

(22) Filed: Sep. 10, 2012

(65) Prior Publication Data

US 2013/0003900 A1 Jan. 3, 2013

Related U.S. Application Data

(63) Continuation of application No. PCT/CN2010/073495, filed on Jun. 3, 2010.

(30) Foreign Application Priority Data

Mar. 10, 2010 (CN) .......................... 2010 1 0123210.3

(51) Int. Cl.
*H04L 27/06* (2006.01)
(52) U.S. Cl.
USPC .......................................................... 375/340
(58) Field of Classification Search
USPC .......... 375/219, 222, 257–258, 316, 340, 346, 375/350; 455/402; 370/344, 480
See application file for complete search history.

(56) References Cited

U.S. PATENT DOCUMENTS

| 7,123,892 | B2 * | 10/2006 | Li et al. .......................... 455/142 |
| 2002/0071452 | A1 * | 6/2002 | Abraham ....................... 370/480 |
| 2004/0242185 | A1 * | 12/2004 | Lee ................................. 455/402 |
| 2009/0074041 | A1 * | 3/2009 | Cappelletti et al. ........... 375/222 |

FOREIGN PATENT DOCUMENTS

| CN | 2697956 Y | 5/2005 |
| CN | 1933348 A | 3/2007 |
| CN | 1988402 A | 6/2007 |
| CN | 101621312 A | 1/2010 |

OTHER PUBLICATIONS

International Search Report of International Application No. PCT/CN2010/073495, dated Jun. 3, 2010.

* cited by examiner

*Primary Examiner* — Khanh C Tran
(74) *Attorney, Agent, or Firm* — J.C. Patents

(57) ABSTRACT

The present invention provides a micro-controller, a processing method and device for power line carrier signal reception, where the method includes: an analog mixer mixes received power line carrier signals, an analog filter filters the mixed power line carrier signals, an analog-to-digital converter converts the filtered signals, a digital mixer mixes converted signals, a digital filter filters the mixed signals and a digital demodulator demodulates the filtered signals to obtain base band data. The present invention also provides a corresponding device and a micro-controller including the device. The technical solution of the present invention can modulate the carrier signals of any frequency to a fixed frequency through two-stage frequency mixing, so that demodulation of power line carrier signals with any frequency is possible.

9 Claims, 3 Drawing Sheets

MICRO-CONTROLLER, PROCESSING METHOD AND DEVICE FOR POWER LINE CARRIER SIGNAL RECEPTION

CROSS-REFERENCE TO RELATED APPLICATIONS

This application is a continuation of International Application No. PCT/CN2010/073495, filed on Jun. 3, 2010, which claims the priority benefit of China Patent Application No. 201010123203.1, filed on Mar. 10, 2010. The contents of the above identified applications are incorporated herein by reference in their entirety.

TECHNICAL FIELD

The present invention relates to the technical field of power line carrier communication, and particularly, to a micro-controller, a processing method and device for power line carrier signal reception.

BACKGROUND TECHNOLOGY

PLC (Power Line carrier Communication) refers to a communication mode in which power line is used as an information transmission medium and the signals are transferred between nodes in a power grid using a carrier modulation technology. The PLC technology is widely used in many applications such as remote meter reading, smart home appliances, etc.

The power line is a complex communication system with large signal attenuation, small line impedance, various noise sources and strong interference. For a same power line section, the transmission property varies because of different components connected to this section at different time. The transmission properties of power lines in different regions also have great differences. The influence on a carrier signal due to the factors above depends on the signal frequency. For current PLC technology, carrier signals with a fixed frequency are used. When receiving, the PLC signals will first be amplified by a preamplifier, filtered by a bandpass filter and then output to a demodulator for demodulation.

Following problems in current PLC technology were found during this invention: the processing method and device for the power line carrier signals in current PLC technology is only suitable for carrier signals with fixed frequency, which may not meet the demand of the current PLC.

SUMMARY

Embodiments of the present invention provide a micro-controller, a processing method and device for power line carrier signal reception to solve the problem that only carrier signals with a fixed frequency can be processed in the current technology and to improve the system performance by realizing the processing of carrier signals with random frequency.

Embodiments of the present invention provide a processing method for power line carrier signal reception, including:

Frequency mixing, by an analog mixer, received signals, a carrier frequency of the mixed signals is within a passband of an analog filter;

Filtering, by the analog filter, the mixed signals;

Performing an analog-to-digital conversion of the filtered signals and frequency mixing of the converted digital signals, by a digital mixer, the where a carrier frequency of the mixed digital signals is within a passband of a digital filter;

By the digital filter, filtering the mixed digital signals, and sending the filtered signals to a digital demodulator; and Performing, by the digital demodulator, demodulation of the filtered signals to obtain base band data.

Embodiments of the present invention further provide a processing device for power line carrier signal reception, including:

An analog mixer, configured to frequency mix received signals, where a carrier frequency of the mixed signals is within a passband of an analog filter;

The analog filter, configured to filter the mixed signals;

An analog-to-digital converter, configured to perform an analog-to-digital conversion of the filtered signals;

A digital mixer, configured to frequency mix the converted signals, where a carrier frequency of the mixed signals is within a passband of a digital filter;

The digital filter, configured to filter the mixed signals, and send the filtered signals to a digital demodulator; and The digital demodulator, configured to perform demodulation of the filtered signals to obtain base band data.

Embodiments of the present invention further provide a micro-controller, including a central processing unit, a power line coupling circuit and the processing device mentioned above for power line carrier signal reception. The central processing unit is configured to control the processing device for power line carrier signal reception, the power line coupling circuit is configured to separate the power line carrier signals from received power line signals and to send the power line carrier signals to the processing device.

According to the micro-controller, the processing method and device for power line carrier signal reception according to embodiments of the present invention, an analog mixer mixes the received power line carrier signals to obtain signals with carrier frequency in the passband of the analog filter. Furthermore, a digital mixer is provided after the analog-to-digital conversion to mix the digital signals to obtain signals with carrier frequency in the passband of the digital filter. According to the configurations of the two stage mixers mentioned above, any frequency of the power line carrier signals can be transformed to a fixed frequency area through frequency mixing, so it is not necessary to use carrier signals with fixed frequency for data transmission, which greatly meets the demand of power line communication and improves the adaptability of the power line communication signals.

BRIEF DESCRIPTION OF THE DRAWINGS

To illustrate the technical solutions in embodiments of the present invention or the prior art more clearly, the accompanying drawings needed in the description of the embodiments or the prior art will be briefly described hereunder. Evidently, the accompanying drawings in the following description illustrate only some embodiments of the present invention, and those of ordinary skills in the art may obtain other accompanying drawings based on these accompanying drawings without creative efforts.

DETAILED DESCRIPTION

Figure 1:
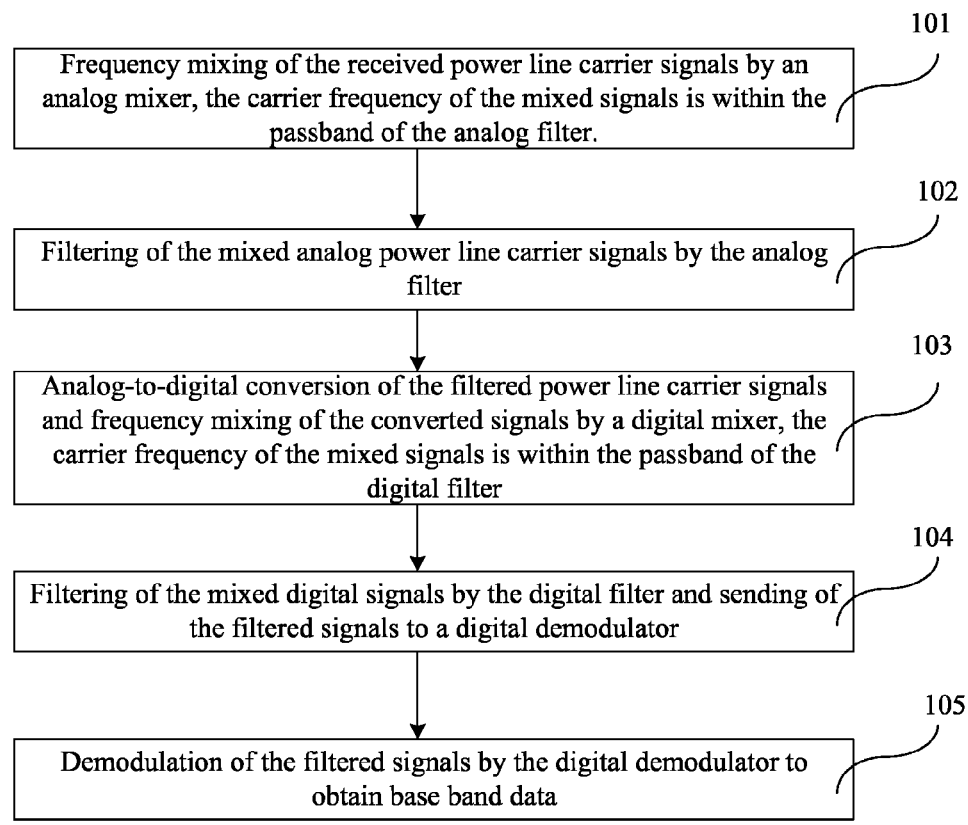
FIG. 1 is a schematic flowchart of a processing method for power line carrier signal reception according to an embodiment of the present invention.

In order to overcome the problem that the processing method and device for power line carrier signals of the prior art only processes carrier signals with a fixed frequency, embodiments of the present invention provide a processing method for power line carrier signal reception. FIG. 1 is a schematic flowchart of a processing method for power line carrier signal reception according to an embodiment of the present invention, as shown in FIG. 1, the method includes:

Step 101: frequency mixing of the received power line carrier signals by an analog mixer, the carrier frequency of the mixed signals is within the passband of the analog filter. The analog mixer in this embodiment can mix the input power line carrier signals with signals generated by the local oscillator within the analog mixer. The frequency of the local oscillator within the analog mixer is configurable and can be set according to the signal of the central processing unit, so that the analog mixed power line carrier signals can be modulated to any frequency. The frequency of the analog mixed signals in this embodiment can be determined by the center frequency of the analog filter in the signal link. The frequency of the power line carrier signals can be modulated to the passband of the analog filter. A preferred way is to modulate the signal frequency to the center frequency area of the analog filter;

Step 102: filtering of the mixed analog power line carrier signals by an analog filter. After step 101, the frequency of the signals has been modulated to the passband of the analog filter, so that the power line carrier signals can pass the analog filter successfully, whereas the noise will be filtered away;

Step 103: analog-to-digital conversion of the filtered power line carrier signals and frequency mixing of the converted signals by a digital mixer, the carrier frequency of the mixed signals is within the passband range of the digital filter;

Step 104: filtering of the mixed digital signals by a digital filter and sending of the filtered signals to the digital demodulator; and Step 105: demodulation of the filtered signals by a digital demodulator to obtain base band data.

In the embodiment above, an analog mixer mixes the received power line carrier signals to obtain signals with carrier frequency in the passband of the analog filter. Further more, a digital mixer is provided after the analog-to-digital conversion to mix the digital signals to obtain signals with carrier frequency in the passband of the digital filter. According to the configurations of the two stage mixers mentioned above, any frequency of the power line carrier signals can be transformed to a fixed frequency area through frequency mixing, so it is not necessary to use carrier signals with fixed frequency for data transmission, which greatly meets the demand of power line communication and improves the adaptability of the power line communication signals.

In step 103 of the embodiment above, the frequency of the local oscillator within the digital mixer is configurable and can be set according to the signal of the central processing unit, so that the frequency of the mixed signals is within the passband of the digital filter. In specific applications, it is preferred to mix the signal frequency to a fixed frequency area around the center frequency of the digital filter, so that the complexity of the digital filter and the design difficulty of the back-end digital demodulation circuit can be significantly reduced. In addition, the filter used in the embodiment above could either be a bandpass filter or a lowpass filter.

Additionally, the energy of the signals input to the digital demodulator could be processed through automatic gain control, which includes the following steps: a parameter collect module computes the output energy parameter of the digital demodulator, a gain control module generates the control signal for the gain amplifier according to the output energy parameter and the gain amplifier amplifies or attenuates the power line carrier signals before analog-to-digital conversion according to the control signal.

In the embodiment above, amplification process of the received analog signals by a low noise amplifier could also be included before the analog mixer mixes the received power line carrier signals.

To summarize all the embodiments above, any frequency could be modulated to a certain frequency by adding analog mixer and digital mixer to the processing procedure for power line carrier signal reception. This means that data transmission through power line carrier signals with multiple frequencies could be supported by modulating the frequencies of the power line carrier signals to the passband of the filter.

Figure 2:
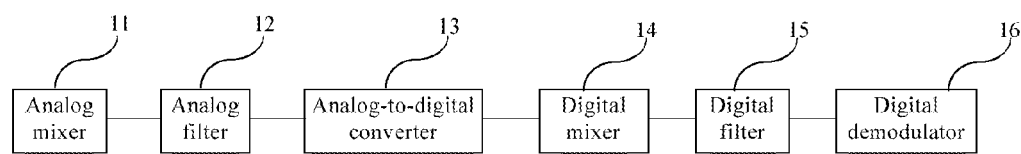
FIG. 2 is a schematic structural diagram of a processing device for power line carrier signal reception according to an embodiment of the present invention.

Corresponding to the method embodiments above, the present invention further provides a processing device for power line carrier signal reception. FIG. 2 is a schematic structural diagram of a processing device for power line carrier signal reception according to an embodiment of the present invention. As shown in FIG. 2, the device includes an analog mixer 11, an analog filter 12, an analog-to-digital converter 13, a digital mixer 14, a digital filter 15 and a digital demodulator 16. The analog mixer 11 is configured to frequency mix the received power line carrier signals, the carrier frequency of the mixed signals is within the passband of the analog filter. The analog filter 12 is used for filtering of the mixed power line carrier signals. The analog-to-digital converter 13 is configured to perform an analog-to-digital conversion of the filtered signals. The digital mixer 14 is configured to frequency mix the converted signals, and the carrier frequency of the mixed signals is within the passband of the digital filter 15. The digital filter 15 is configured to filter the mixed signals and send the filtered signals to the digital demodulator 16. The digital demodulator 16 is configured to perform demodulation of the filtered signals to obtain base band data.

In the embodiment above, an analog mixer mixes the received power line carrier signals to obtain signals with carrier frequency in the passband of the analog filter. Further more, a digital mixer is provided after the analog-to-digital conversion to mix the digital signals to obtain signals with carrier frequency in the passband of the digital filter. Through proper configurations of these two mixers mentioned above, the modulation of any frequency of the power line carrier signals to a fixed frequency area is possible, so that the usage of carrier signal with fixed frequency for data transmission is unnecessary and the demands of power line communication could be greatly met, the adaptability of the power line communication signals could be significantly improved.

In order to control the energy of the input signals for the digital demodulator, the processing device for power line carrier signal reception may further include a parameter collect module, a gain control module and a gain amplifier. The parameter collect module computes the output energy parameter of the digital demodulator, the gain control module generates the control signal for the gain amplifier according to the output energy parameter and the gain amplifier amplifies or attenuates the power line carrier signals before analog-to-digital conversion according to the control signal. The amplifying or attenuating magnification of the gain amplifier could be effectively controlled by configuring the modules mentioned above to perform a negative feedback control for the signal intensity.

In the device mentioned above, amplification process of the received power line carrier signals by a low noise amplifier could also be included before the analog mixer mixes the signals.

Figure 3:
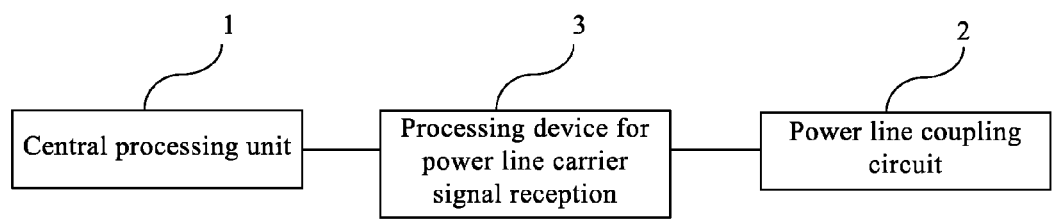
FIG. 3 is a schematic diagram of a micro-controller according to an embodiment of the present invention.

Embodiments of the present invention further provide a micro-controller. FIG. 3 is a schematic diagram of a micro-controller according to an embodiment of the present invention. The micro-controller is a micro-control system used in power line carrier communication. As shown in FIG. 3, the micro-control system includes a central processing unit 1, a power line coupling circuit 2 and a processing device mentioned above for power line carrier signal reception 3. The central processing unit 1 is used for controlling of the processing device for power line carrier signal reception 3. For example, the central processing unit 1 could be used to control the frequencies of the local oscillators within the analog mixer and the digital mixer. The power line coupling circuit 2 is used to separate the power line carrier signals from the received power line signals and to send the power line carrier signals to the processing device for power line carrier signal reception 3.

The processing device mentioned above for power line carrier signal reception 3 is able to perform a two-stage frequency mixing using an analog mixer and a digital mixer for the received power line carrier signals. Through proper configurations of these two mixers, the modulation of any frequency of power line carrier signals to a fixed frequency area is possible, so that the usage of carrier signal with fixed frequency for data transmission is unnecessary and the demands of power line communication could be greatly met, the adaptability of the power line communication signals could be significantly improved.

Figure 4:
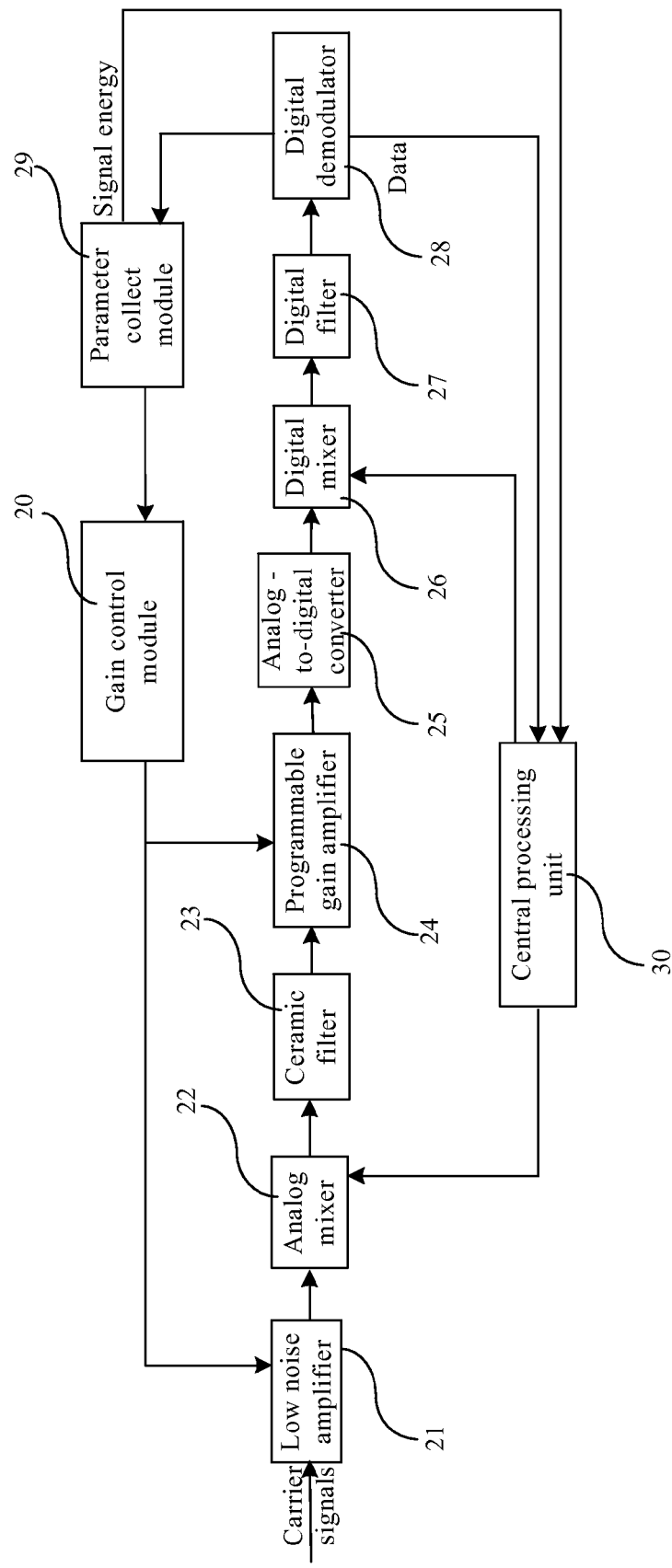
FIG. 4 is a schematic structural diagram according to a specific embodiment of the present invention.

Corresponding to the processing method and device for power line carrier signal reception and the micro-controller in the embodiments above, FIG. 4 is a schematic structural diagram according to a specific embodiment of the present invention. In this specific application, the power line carrier signals will be separated from the received power line signals after passing through the power line coupling circuit. The power line carrier signals will then be sent to a low noise amplifier 21 for amplification. The amplified signals will be mixed by the following analog mixer 22, which is connected with the central processing unit 30. The frequency of the local oscillator within the analog mixer could be configured according to the control signal of the central processing unit 30, so that the carrier frequency of the mixed signal could be modulated to the passband of the following analog filter. Specifically, a ceramic filter 23 could be used for the analog filter. Ceramic filter has fixed center frequency and excellent filtering ability, it is able to filter away the noises effectively, so that the design difficulty of the back-end demodulation circuit could be reduced.

The carrier signals filtered by the ceramic filter 23 will be imported to a programmable gain amplifier 24. The amplifying or attenuating magnification of the programmable gain amplifier 24 is configurable. The amplified or attenuated carrier signals will be converted into digital carrier signals through an analog-to-digital converter 25 and will then be mixed by a digital mixer 26. The digital mixer 26 is connected with the central processing unit 30, the frequency of the local oscillator within the digital mixer could be configured according to the control signal of the central processing unit 30, so that the carrier frequency of the mixed signals could be modulated to the passband of the following digital filter. This would improve the filtering effect of the digital filter to obtain carrier signals with higher signal to noise ratio, which could reduce the design difficulty of the digital demodulator circuit. The mixed carrier signals will then be filtered by a digital filter 27 and finally demodulated to base band data by a digital demodulator 28.

Furthermore, a parameter collect module 29 could be configured to compute the output energy parameter (i.e., signal energy) of the digital demodulator and feed it back to an automatic gain control module 20. The automatic gain control module 20 can generate a control signal for the gain amplifier according to the output energy parameter and send it to the programmable gain amplifier 24, so that the programmable gain amplifier 24 could amplify or attenuate the power line carrier signals before the analog-to-digital conversion according to the control signal. In specific embodiments, a communication control register may also be configured. The central processing unit controls the frequencies of the local oscillators in the analog mixer and the digital mixer through the communication control register. The demodulated base band data from the digital demodulator and the signal energy computed by the parameter collect module could be sent to the communication control register for data reading by the central processing unit.

In the embodiment above, the carrier frequency of the received power line carrier signals could be modulated to the passband of the filter through configuration of the analog and digital mixers, so that the carrier frequency of the power line carrier signals could be chosen freely. Through proper configurations of these two mixers, especially the digital mixer, the modulation of any frequency of the power line carrier signals to the center frequency area of the digital demodulator is possible, so that the usage of carrier signal with fixed frequency for data transmission is unnecessary and the demands of power line communication could be greatly met, the adaptability of the power line communication signals could be significantly improved. Besides, the use of the ceramic filter could improve the system performance effectively and reduce the difficulty and cost of system design.

Those of ordinary skills in this technical field should understand that all or part of the steps for realizing the method embodiments above could be accomplished by a program-instruction related hardware. The program may be stored in a computer readable storage medium and can execute steps of the method specified in the above embodiments. The storage medium mentioned above may be any medium capable of storing program codes, such as ROM, RAM, magnetic disk or CD.

Finally, it should be noted that the above embodiments are merely provided for describing the technical solutions of the present invention, but not intended to limit the present invention. Although the present invention has been described in detail with reference to the foregoing embodiments, it should be understood that those of ordinary skills in this technical field can make modifications to the technical solutions recited in the foregoing embodiments or equivalent substitutions of part of the technical features. These modifications or substitutions do not make the essence of their corresponding technical solutions deviate from the spirit or scope of the technical solutions of the embodiments of the present invention.

What to be claimed is:

1. A processing method for power line carrier signal reception, comprising:
    by a low noise amplifier, amplifying received analog signals according to an control signal and sending the amplified signals to an analog mixer;

frequency mixing, by the analog mixer, received power line carrier signals, wherein a frequency of the mixed signals is within a band-pass of an analog filter;

filtering, by the analog filter, the mixed signals;

performing an analog-to-digital conversion of the filtered signals, and frequency mixing, by a digital mixer, the converted signals, wherein a frequency of the mixed signals is within a band-pass of a digital filter;

by the digital filter, filtering the mixed signals, and sending the filtered signals to a digital demodulator;

performing, by the digital demodulator, demodulation of the filtered signals to obtain base band data;

computing, by a parameter collect module, an output energy parameter of the digital demodulator; and generating, by a gain control module, the control signal for the low noise amplifier according to the output energy parameter.

2. The method according to claim 1, further comprising: amplifying, by a programmable gain amplifier, the power line carrier signals immediately before the analog-to-digital conversion according to the control signal.

3. The method according to claim 1, wherein frequency mixing, by the analog mixer, the received power line carrier signals comprises:

frequency mixing, by the analog mixer, the received power line carrier signals immediately after amplifying, by the low noise amplifier, the received analog signals.

4. A processing device for power line carrier signal reception, comprising:

a low noise amplifier, configured to amplify received power line carrier signals according to an control signal and send the amplified signals to an analog mixer;

the analog mixer, configured to frequency mix received power line carrier signals, wherein a carrier frequency of the mixed signals is within a band-pass of an analog filter;

the analog filter, configured to filter the mixed signals;

an analog-to-digital converter, configured to perform an analog-to-digital conversion of the filtered signals;

a digital mixer, configured to frequency mix the converted signals, wherein a carrier frequency of the mixed signals is within a band-pass of a digital filter;

the digital filter, configured to filter the mixed signals and send the filtered signals to a digital demodulator; and a parameter collect module, configured to compute an output energy parameter of the digital demodulator; and an automatic gain control module, configured to generate the control signal for the low noise amplifier according to the output energy parameter.

5. The device according to claim 4, further comprising:

a programmable gain amplifier, configured to amplify or attenuate the power line carrier signals immediately before the analog-to-digital conversion according to the control signal.

6. The device according to claim 4, wherein the analog filter is a ceramic filter.

7. The device according to claim 4, wherein: the analog mixer is further configured to frequency mix received power line carrier signals immediately after the low noise amplifier amplifies the received power line carrier signals.

8. A micro-controller, comprising: a central processing unit, a power line coupling circuit and the processing device for power line carrier signal reception according to claim 4, wherein the central processing unit is configured to control the processing device for power line carrier signal reception, the power line coupling circuit is configured to separate the power line carrier signals from received power line signals and send the power line carrier signals to the processing device for power line carrier signal reception.

9. The micro-controller according to claim 8, wherein the central processing unit is configured to control local oscillator frequencies of the analog mixer and the digital mixer.

\* \* \* \* \*